United States Patent [19] [11] 3,715,202
Kosmider et al. [45] Feb. 6, 1973

[54] METHOD FOR DESULPHURIZING PIG IRON
[75] Inventors: Hans Kosmider, Bremen-Lesum; Dieter Danckert, Brankland, both of Germany
[73] Assignee: Klockner-Werke Aktiengesellschaft, Duisburg, Germany
[22] Filed: Feb. 16, 1971
[21] Appl. No.: 115,296

[30] Foreign Application Priority Data
  March 6, 1970  Germany.....................P 20 10 585.5

[52] U.S. Cl. .....................................................75/58
[51] Int. Cl. ...........................C21b 3/02, C21b 11/08
[58] Field of Search..........................................75/58

[56] References Cited
UNITED STATES PATENTS

| | | | |
|---|---|---|---|
| 2,577,764 | 12/1951 | Hulme | 75/58 X |
| 2,692,196 | 10/1954 | Hulme | 75/58 X |
| 2,863,755 | 12/1958 | Kurzinski | 75/58 X |
| 2,963,364 | 12/1960 | Crockett et al. | 75/130 R |

Primary Examiner—Charles N. Lovell
Assistant Examiner—J. E. Legru
Attorney—Kenwood Ross and Chester E. Flavin

[57] ABSTRACT

A method for the desulphurization of pig iron envisioning a continuously flowing pig iron stream having a descending flow portion in which a desulphurizer ascends in opposite flow direction.

7 Claims, 1 Drawing Figure

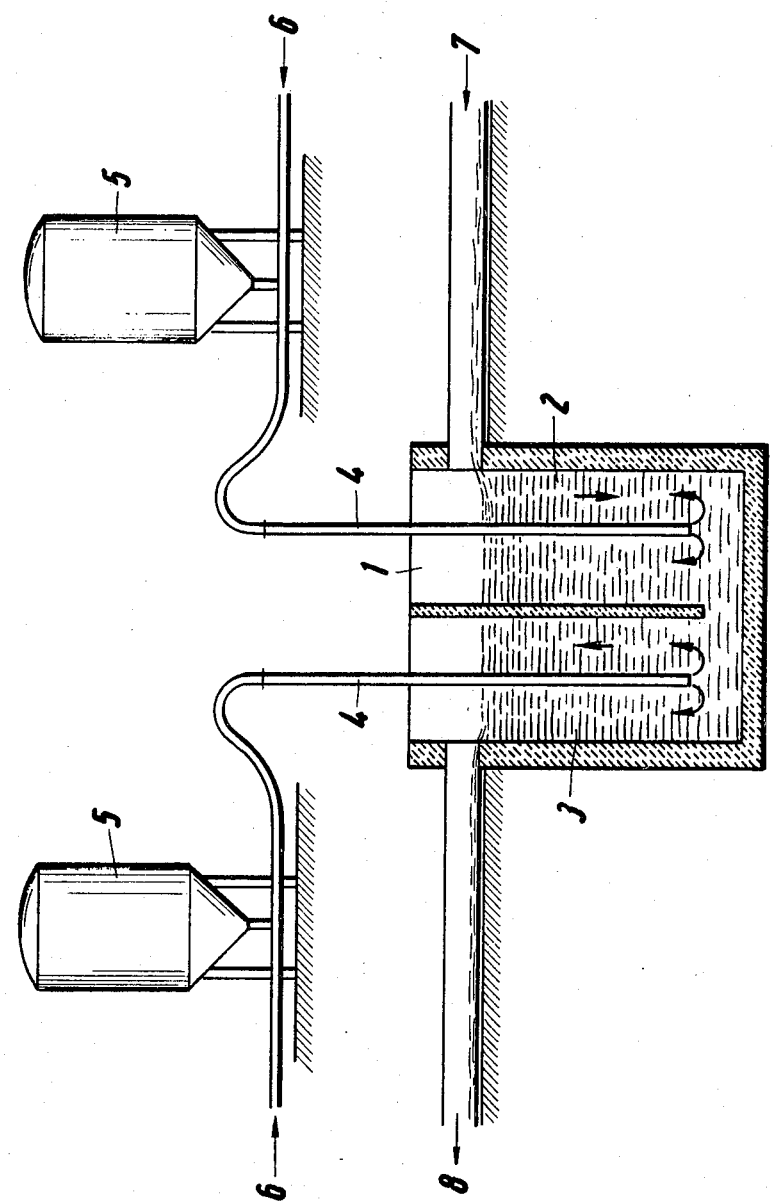

METHOD FOR DESULPHURIZING PIG IRON

The invention relates to a process for the desulphurization of pig iron.

As is known, iron is extracted from iron ore and concentrates by pyrometallurgical processes based upon the application of heat and reducing gases. At temperatures of 700° – 1,100°C, iron oxides such as hematite ($Fe_2O_3$) and magnetite ($Fe_3O_4$), the principal iron-bearing minerals, are readily reduced to metallic iron.

Reduction is carried out in blast furnaces and in so-called direct-reduction processes. The blast-furnace process employing coke produces molten pig iron containing about 4.0 percent carbon and a total of approximately 3.0 percent of manganese, silicon, and phosphorus, which must be largely removed in the conversion of pig iron into steel, the principal outlet for iron.

The blast-furnace process is the most widely used method for the production of molten pig iron which can be cast into useful shapes or refined into steel. The production of liquid pig iron and slag in a continuous operation marked the beginning of the blast-furnace process. This was the result of the development of equipment for forcing a strong blast of air into a deeper bed of fuel and driving the products of combustion upward through an overlying column or bed of raw materials consisting of ore, coke, and flux. The blast furnace consists, therefore, of a heat-transfer reduction and melting chamber superimposed on a gas producer.

Cast iron is a generic term describing a family of iron alloys containing 1.8 – 4.5 percent carbon. Cast iron usually is made into specified shapes, called castings, for direct use or for processing by machining, heat treating, or assembly. In special cases, it may be forged or rolled moderately. Generally, it is unsuitable for drawing into rods or wire, although, to a limited extent, it has been continuously cast into rods and shapes from a liquid bath or swaged from bars into smaller-dimensional units.

Cast iron is often made into blocks or rough shapes and called pig iron. It is an intermediate form of cast iron used for remelting into iron castings. Pig iron usually is produced from iron ore and coke smelted into liquid iron in the blast furnace. In some cases, this liquid iron is poured into sand molds of specific design, which, when cleaned and trimmed, become ingot molds for steel manufacture. In these instances, the cast iron may be referred to as direct metal, indicating its production in the blast furnace without the intermediate remelting in the cupola furnace of the foundry, which is common practice in the manufacture of iron castings.

The metal of an ore, or of a mixture of ores, is melted out of the ore mass into a fused, liquid condition by the aid of heat and fluxes and is then cast, i.e., poured into molds, in the first instance usually in the form of pigs. Pig iron is thus cast iron, but the latter term is more generally understood to refer to manufactured articles made directly from melted iron as distinguished from wrought or malleable iron, which is iron manufactured by hammering, rolling, or pressing.

Thus, pig iron is the direct metallic product, either solid or molten, of a blast furnace smelting iron ore, and it is to be added that such pig iron, either solid or molten, has the capacity to absorb a portion of the sulphur contained in the coking ash.

Depending upon slag ratio and slag quantity, the sulphur content of pig iron normally varies between 0.025 and 0.100 percent.

Sulphur deleteriously affects the mechanical properties of the resultant iron and steel products, ergo any sulphur content of the pig iron, in excess of an admissible limit, has to be reduced outside of or following the blast furnace.

As known, that admissible limit of sulphur content in pig iron for the production of an ordinary low carbon steel is 0.030 percent.

For a guideline, accordingly, let it be considered that pig iron produced in the blast furnace and allowing anything more than 0.030 percent of sulphur must be subsequently desulphurized.

Now it is known to desulphurize pig iron outside of or following the blast furnace by way of filling a ladle with the pig iron and adding thereto, as a single charge or in a series of smaller incremental charges, soda in granulated or powder form.

And it is also known to blow by pneumatic means a lime or calcium carbide powder into the inactive pig iron in the ladle by means of an immersion lance. But this comprehends a discontinuous method, wherefor the pig iron to be desulphurized must first be collected in the ladle in order to desulphurize the total ladle content. Such large quantities of pig iron have to be desulphurized in most metallurgical plants that this method is obviously relatively expensive.

It is a primary object hereof to provide a new and novel method for continuously desulphurizing pig iron. In a continuous flow, we exploit the fact that in that portion of the pig iron stream, where the stream descends, the flow direction of the desulphurizer is opposite or ascending.

According to one feature of the invention, in a continuously flowing, first falling and then ascending pig iron stream, the desulphurizer ascends opposite to and/or in the flow direction of the pig iron stream.

According to the invention, pig iron tapped from a melting device may be immediately desulphurized, with the desulphurizer being continuously blown into the pig iron stream by means of one or more blowing lances. As a desulphurizer, a fine-grained calcium-carbide powder is used, which at a grain of 60 $\mu$ has a grain dispersion range between 10 and 100 $\mu$. The pig iron stream is charged with the desulphurizer for a duration of at least 45 sec. and each lance is immersed into the pig iron stream for a length of at least 60 cm.

The invention relates also to an apparatus for carrying out the method, the apparatus being characterized in that the reaction chamber is constructed as a communicating tube and in one or both of the tube arms, a blowing lance is disposed, which blowing lance is provided with one or more outlets.

The apparatus for desulphurizing the pig iron tapped from the blast furnace is arranged behind the skimmer in the blast furnace tapping spout.

The advantage is that the pig iron produced in the blast furnace or molten in the cupola may be continuously desulphurized during the exit of the melting device so that a collection of larger molten quantities in a ladle following desulphurization is not necessary, and the pig iron is in fact desulphurized during passage through the tapping spout.

In this way, considerable losses in time and money may be avoided, of special importance when and if large pig iron quantities have to be desulphurized.

Generally, it is sufficient, if the desulphurizer ascends in the continuously flowing, falling pig iron stream opposite to its flowing direction. However, if the sulphur content should be further reduced, say because of special requirements, it is possible to blow a desulphurizer additionally into the tube, in which the pig iron stream ascends, which desulphurizer then ascends with the flowing direction of the pig iron stream.

Furthermore, it is possible herewith to desulphurize a continuously flowing, first falling and then ascending, pig iron stream only in the ascending pig iron stream but in this case, desulphurization is not so effective.

Which of the aforementioned methods is used in a given case is essentially dependent upon the quantity of sulphur necessary to be removed from the pig iron.

In order to effect a combination of the aforementioned methods, it is only necessary to blow a desulphurizer into the ascending pig iron stream by means of a second blowing lance.

The apparatus is simple in its construction and operation and is easy to mount into already existing spouts of blast or supplementary cupola furnaces.

Adaptation of the apparatus for carrying out the single or combined desulphurization is easily performed, it being only necessary to push either one or both of the blowing lances into the device which is constructed as a communicating tube, and then to charge the stream with the desulphurizer. The apparatus, therefore, may be easily adapted to provide the desired sulphur content during the already running desulphurizing process.

The degree of desulphurization is dependent: (1) upon the holding time of the pig iron in the reactor, (2) upon the immersion depth of the blowing lance, (3) upon the grain size of the desulphurizer, (4) upon the quantity of the desulphurizer (kg per ton of pig iron), (5) upon the initial sulphuric content, and (6) upon the desired final content of sulphur in the pig iron.

According to the invention, the holding time of the pig iron in each reactor vessel should not be below 45 sec. and the smallest depth of immersion of the blowing lance should not be below 60 cm. A grain of 60 $\mu$ with a grain dispersion range of 10 – 100 $\mu$ has been found to be very effective.

According to one illustrative example, desulphurization was carried out by a counter flowing method in which the initial sulphuric content of the pig iron amounted to 0.045 percent. With a calcium-carbide consumption of 4 kg per ton of pig iron and during a holding time of 85 sec., the sulphur content was reduced to 0.017 percent uniformly over the total tapping.

The method, according to the invention, is explained by way of example in the accompanying drawing, representative of a preferred embodiment.

A desulphurization vessel 1 has the general form of a communicating tube and consists of a pair of tube arms 2 and 3 spaced from each other by a separator wall.

Flowing in the direction of arrow 7, the pig iron is tapped from the blast furnace and first enters tube arm 2 and there forms a falling stream, then flows under the separator wall, then ascends in tube arm 3, and then flows through a spout in direction of arrow 8 into the ladle.

The desulphurizer is introduced into the falling stream in tube arm 2 as well as into the ascending stream in tube arm 3 by means of respective blowing lances 4.

In tube arm 2, the desulphurizer flows in direction opposite to the flowing direction of the pig iron stream according to the arrows indicated at the end of blowing lances 4, while in tube arm 3 the desulphurizer flows in direction with the flowing direction of the pig iron stream.

Silos for the desulphurizer are indicated at 5, from where the desulphurizer enters the connection pipes of blowing lances 4.

The desulphurizer is pneumatically transported by means of compressed air which is flowing in the direction of the respective arrow 6.

We claim:

1. Method for the desulphurization of pig iron in a continuously-flowing first falling and then ascending stream comprising the steps: forming the falling stream while tapping from a blast furnace; feeding an ascending desulphurizer into said falling stream; forming the ascending stream by flowing into a tube arm; feeding an ascending desulphurizer into said ascending stream; and flowing said desulphurized stream through a spout and into a ladle.

2. Method, according to claim 1, characterized in that the pig iron tapped out of a melting apparatus is immediately desulphurized.

3. Method, according to claim 2, characterized in that the desulphurizer is continuously blown into the pig iron stream by means of a blowing lance.

4. Method, according to claim 1, characterized in that the desulphurizer consists of calcium-carbide powder of find grain.

5. Method, according to claim 4, characterized in that the grain is of 60 with a grain dispersion range between 10 and 100.

6. Method, according to claim 1, characterized in that the pig iron stream is charged with a desulphurizer for at least 45 sec.

7. Method, according to claim 3, characterized in that the blowing lance is immerged into the pig iron stream at a length of at least 60 cm.

* * * * *